United States Patent
Geist et al.

(10) Patent No.: US 10,841,145 B1
(45) Date of Patent: Nov. 17, 2020

(54) MULTI-ROTATIONAL WAVEFORM UTILIZING A PLURALITY OF TRANSMISSION WAVEFORMS AND TRANSMISSION PATHS

(71) Applicant: Envistacom, LLC, Atlanta, GA (US)

(72) Inventors: Michael Geist, Huntersville, NC (US); Michael Beeler, Jefferson, MD (US); Kasra Akhavan-Toyserkani, Rockville, MD (US); Harold Thomas Cox, Suwanee, GA (US)

(73) Assignee: Envistacom, LLC, Atlanta, GA (US)

( * ) Notice: Subject to any disclaimer, the term of this patent is extended or adjusted under 35 U.S.C. 154(b) by 0 days.

(21) Appl. No.: 16/516,967

(22) Filed: Jul. 19, 2019

Related U.S. Application Data

(60) Provisional application No. 62/862,389, filed on Jun. 17, 2019.

(51) Int. Cl.
| | | |
|---|---|---|
| *H04L 27/36* | (2006.01) | |
| *H04L 29/06* | (2006.01) | |
| *H04L 27/38* | (2006.01) | |
| *H04L 1/00* | (2006.01) | |

(52) U.S. Cl.
CPC ............ *H04L 27/361* (2013.01); *H04L 1/004* (2013.01); *H04L 27/3809* (2013.01); *H04L 65/80* (2013.01)

(58) Field of Classification Search
CPC ... H04L 27/361; H04L 27/3809; H04L 65/80; H04L 1/004
See application file for complete search history.

(56) References Cited

U.S. PATENT DOCUMENTS

| | | |
|---|---|---|
| 6,181,734 B1 | 1/2001 | Palermo |
| 7,460,587 B2 * | 12/2008 | Pisoni ................. H04L 27/2662 375/219 |
| 8,089,993 B2 | 1/2012 | Wei et al. |
| 8,358,613 B1 | 1/2013 | Giallorenzi et al. |
| 8,542,755 B2 | 9/2013 | Kopmeiners |
| 9,065,699 B2 | 6/2015 | Stratigos, Jr. |
| 9,112,758 B2 | 8/2015 | Niu et al. |
| 9,264,125 B2 | 2/2016 | Moshfeghi |
| 9,893,774 B2 | 2/2018 | Shattil |
| 10,064,149 B1 | 8/2018 | Anvari |
| 10,177,952 B1 | 1/2019 | Beeler et al. |
| 10,311,002 B2 | 6/2019 | Kawai et al. |
| 10,397,038 B2 | 8/2019 | Beeler et al. |
| 10,505,777 B2 | 12/2019 | Beeler et al. |

(Continued)

FOREIGN PATENT DOCUMENTS

| | | |
|---|---|---|
| WO | 2017203534 A1 | 11/2017 |
| WO | 2018104929 A1 | 6/2018 |

OTHER PUBLICATIONS

International Search Report and Written Opinion of International Patent Application No. PCT/US18/38397 dated Jul. 27, 2018.

(Continued)

*Primary Examiner* — Kabir A Timory
(74) *Attorney, Agent, or Firm* — McBee Moore & Vanik IP, LLC

(57) ABSTRACT

Disclosed is a modem system for transmitting and receiving multi-rotational waveforms comprising at least one waveform modulation subsystem, and a demodulation subsystem programmed to receive a second plurality of sequentially modulated communication waveforms.

24 Claims, 10 Drawing Sheets

(56) References Cited

U.S. PATENT DOCUMENTS

| | | | |
|---|---|---|---|
| 2003/0152023 A1* | 8/2003 | Hosur | H04L 27/2602 370/208 |
| 2007/0030116 A1 | 2/2007 | Feher | |
| 2008/0112361 A1 | 5/2008 | Wu | |
| 2011/0176603 A1 | 7/2011 | Beeler et al. | |
| 2014/0123101 A1 | 5/2014 | Kim | |
| 2014/0376418 A1 | 12/2014 | Banerjea | |
| 2015/0036664 A1 | 2/2015 | Yuk et al. | |
| 2016/0134376 A1 | 5/2016 | Mateosky et al. | |
| 2016/0227396 A1 | 8/2016 | Lee et al. | |
| 2018/0375709 A1 | 12/2018 | Beeler et al. | |

OTHER PUBLICATIONS

International Search Report for Application No. PCT/US2020/038217 dated Aug. 26, 2020.

J. Vanderpoorten and K. Zhang, "Flexible modem interface—Enabling DoD wideband Satcom enterprise," MILCOM 2017—2017 IEEE Military Communications Conference (MILCOM), (2017), 128-134.

\* cited by examiner

MULTI-ROTATIONAL WAVEFORM UTILIZING A PLURALITY OF TRANSMISSION WAVEFORMS AND TRANSMISSION PATHS

CROSS REFERENCE TO RELATED APPLICATIONS

This application claims priority to U.S. provisional application No. 62/862,389 filed 17 Jun. 2019, and is related to U.S. patent application Ser. No. 16/213,569, filed Dec. 7, 2018, and to U.S. patent application Ser. No. 15/782,651, filed Oct. 12, 2017, now U.S. Pat. No. 10,177,952, which applications are incorporated herein by reference in their entireties.

BACKGROUND

Since the introduction of communications, the ability to send user information or data through a transmission path requires modulation techniques to translate user data to a modulated carrier for transmission. This purposeful modulation of data is commonly referred to as a communication "waveform." Conversely, the ability to receive a modulated "waveform" and demodulate it to remove the original user data and pass that data along to its intended user is utilized to provide simplex end-to-end connectivity. The combined collection of a modulator and demodulator is known in the art as a "modem" and are utilized to provide the means to generate and decode a "waveform" for duplex connectivity across a given communications path. Traditionally, a waveform is produced by a purpose-built modem device using specialized parts with specialized software and/or firmware to create a single waveform to be utilized to support transmit and receive connectivity. As communications technology has improved, new techniques have been developed to move away from single purpose modem hardware toward a concept known as a Software Defined Modem (SDM) using a relatively generic printed circuit board (PCB) with a general or generic high performance computing resource with the intent that a Central Processing Unit (CPU) can employ a software package to mirror the functionality of purpose-built hardware and thereby create a modem. As such, using this newer technology, using a virtualized modem design as an all software application, one is no longer limited to a single communications path or session, or limited to the use of a single waveform. The described invention uses a plurality of waveforms simultaneously or individually in a prescribed or random order to provide end-to-end connectivity for reasons of data security, resulting in obfuscation, of the information being carried in the communications path(s). Prior to the use of a virtualized modem design, where all waveforms may exist on the same hardware, alternating between a set of communication waveforms efficiently and seamlessly would not have been possible, and would have required many purpose-built modem devices to be present to perform the method described in this disclosure. The multipath architectures that could be supported may include airborne relay, satellite, terrestrial radio, tactical radio, fiber optical cable, free-space optical, or other communications mediums. The method described provides the ability for someone skilled in the art, e.g., a communications or network engineer, or modem designer to understand the concepts described in this disclosure.

This disclosure relates to methods of describing a multi-rotational waveform using a modulator and/or demodulator (modem) that supports a plurality of waveforms to perform a multi-waveform transmission path over a single or a plurality of transmission paths and technologies. The described methods provide the description of how a transmission path may be created using a plurality of waveforms. The described method can be utilized to provide similar support in every aspect of a dedicated (single) waveform, with the added benefit of having no single path containing all data, such that should the waveform be intercepted by an unwanted listener, the data is partially contained in any one waveform and with added obfuscation, portions of the data received on any one waveform (of the plurality of waveforms) would be of no value. Furthermore, the described approach can perform the rotation of the waveform between the plurality of waveforms in real time.

In the prior art, a typical communications waveform supporting a communications link for airborne, satellite, tactical radio, terrestrial, or optical communications is comprised of a user data interface and accepts user data in the form of a digital stream utilizing various synchronous and asynchronous formats and protocols. The modulator portion of the modem accepts the user data and performs the process of modulating the data into a signal that is suitable for the transmission medium utilizing a single waveform. The actual process of the transformation from the user data to the modulated signal results in user information bit, frames or packets being modulated into a single waveform over the transmission medium and perform the steps to return from a modulated waveform to the user data.

The present disclosure covers the steps required to accomplish the creation of the user data prior to modulation in the form of a bit stream, framed, or packetized data prior to the transmission of the multi-rotational waveform. The demodulation process is the reverse or undoing of the modulation process. The entire modulation and demodulation process that comprises a transmission of data, may be accomplished using the described modulation system.

SUMMARY

This disclosure relates to but is not limited to a rotational waveform using a plurality of waveforms and transmission mediums. Traditionally, a typical transmission link supports a single communications waveform over a single satellite, tactical radio, terrestrial radio link, optical link, etc. and is comprised of a user data (serial, framed, or packetized) interface and accepts user data in the form of a digital stream utilizing various synchronous and asynchronous protocols. The modulator portion of the modem accepts the user data and performs the process of modulating the data into a format that is suitable for the transmission medium. The actual process of the transformation from the user data to the modulated stream is carried out by devices or functions required to create a final waveform to be transmitted over the transmission medium. Conversely the demodulator portion of the modem performs the reverse process—again, all carried out by devices or functions to accomplish the steps required to accept a waveform over the transmission medium and perform the steps to return the user data back to the digital stream.

The disclosed invention uses a plurality of waveforms to receive an incoming stream, parse the stream (bit stream, frames, or packets) and pass the stream over an assigned waveform via a fixed, sequential, mathematically known, or random assignment to support the creation of multi-rotational waveform using either a hardware or all software modulation and demodulation device or combined modulation/demodulation device known as a modem.

Particular implementations described herein are and may use, but is not limited to programs, computer programming languages, microprocessors, Application Specific Integrated Circuits (ASICs), Field Programmable Gate Arrays (FPGAs), Digital Signal Processors (DSPs), and combinations of CPUs and FPGAs to form a waveform modulation, demodulator, modulator/demodulator (modem), and High-Performance Computing utilizing a combination of a central processing unit (CPU) and a hardware assist processor, such as an FPGA.

Aspects of this disclosure relate to a method and system for creating a multi-rotational waveform are described herein.

DETAILED DESCRIPTION

Figure 1:
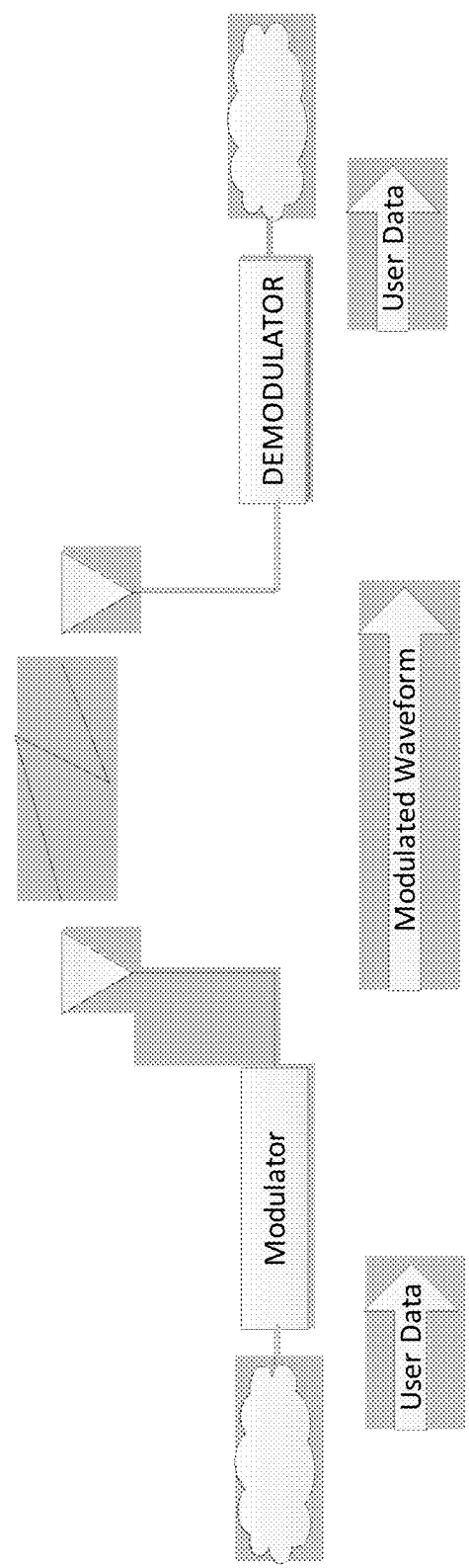
FIG. 1 shows the prior art using a modulator and demodulator for a single waveform for a half-duplex channel.

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. Although any methods, devices or materials similar or equivalent to those described herein can be used in the practice or testing of the invention, the preferred methods, devices, and materials are now described.

This disclosure, its aspects and implementations, are not limited to the specific processing techniques, components, modulation formats, frequency examples, or methods disclosed herein. Many additional components and assembly procedures known in the art consistent with the creation and manipulation of a waveform by a modulator and demodulator (modem) are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

Particular implementations of an all multi-rotational waveform are described. However, as will be clear to those of ordinary skill in the art from this disclosure, the principles and aspects disclosed herein may readily be applied to any modulation, demodulation, and modulation/demodulation device known hereafter as a modem for the creation of a waveform to be carried over a transmission medium for Intermediate Frequency (IF), Radio Frequency (RF), and optical communications systems, such satellite, tactical radio, terrestrial transmission, free-space optical, etc. without undue experimentation.

FIG. 1 illustrates the prior art of a particular implementation of a communications transmission system wherein the forward path (transmitting station to a receiving station) where transmit station contains a transmit modulator and the receiver contains a receiving demodulator using a single waveform. The modem in the prior art utilizes either purpose-built device, typically a dedicated "box" or a virtualized modem that transmits and is called a modulator. A virtualized modem is an embedded computing environment consisting of one or more CPUs along with hardware acceleration co-processors, with adequate API and software stack to abstract the underlying hardware, and capable of hosting a library of communication waveforms implemented as an all software application.

The modulator outputs either an intermediate frequency (IF) that may be unconverted to a radio frequency (RF) or optical, or directly output from the modulator as a radio frequency or optical, possibly power amplified, and transmitted through free-space, to an airborne, or satellite repeating relay. At the receiving station, the receive modem in the prior art is a purpose-built device, typically a dedicated "box" or a virtualized modem that receives and is called a demodulator. The demodulator receives (inputs) either an intermediate frequency (IF) that may be down converted from a radio frequency (RF), optical, or directly input from the receive antenna as a radio frequency signal. This embodiment shows a single transmit to a single receive configuration using a single waveform.

Figure 2:
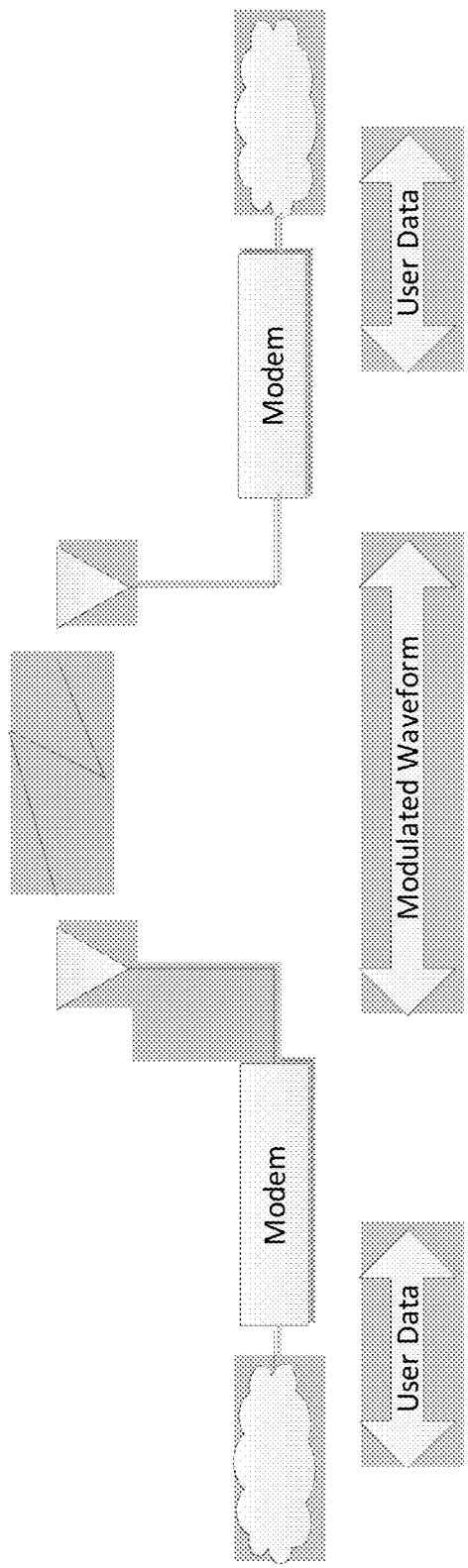
FIG. 2 shows the prior art using a modem for a single waveform for a full-duplex channel.

FIG. 2 is an alternate embodiment, of the prior art where the modulator and demodulator are combined in a single device known as a modulator/demodulator also known as a modem. As a modem, each station may contain a modem that provides both transmit and receive capability, modulation and demodulation, respectively. The modem at each station may provide a full-duplex communications path. In this embodiment, each station may transmit a single waveform and receive a single waveform. For each path, the waveforms may be the same or dissimilar, but showing the prior art, nevertheless.

Figure 3:
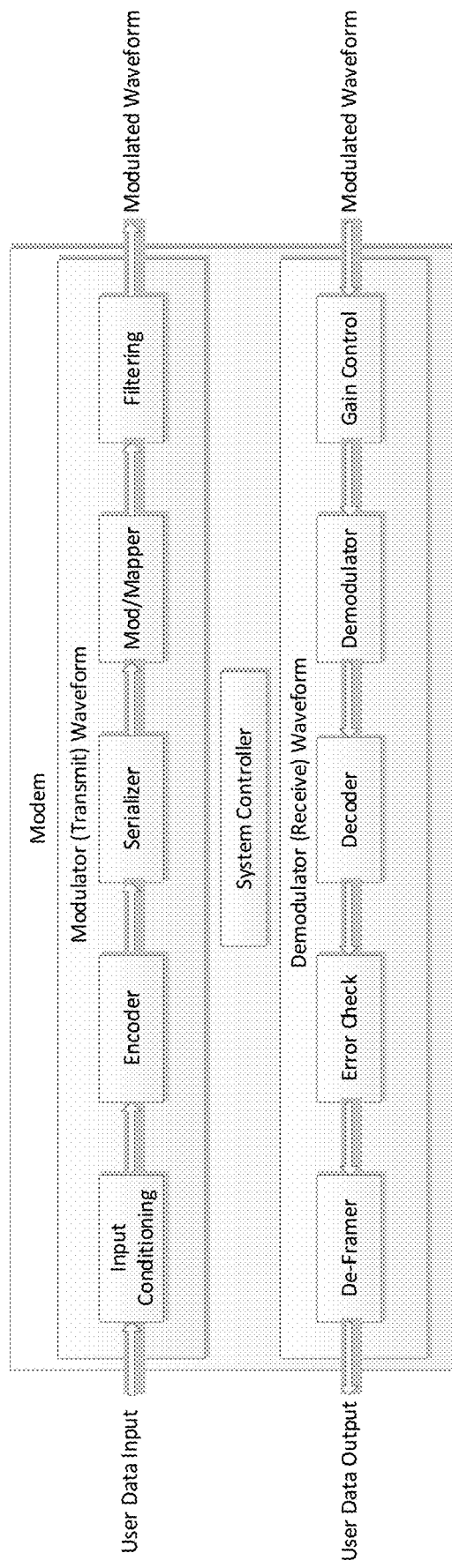
FIG. 3 shows the prior art of a modem's components to support the modulation and demodulation capabilities for creating a waveform.

FIG. 3 shows an embodiment of the prior art where each component of a purpose-built modem or a virtualized modem supporting an all software application comprises both the transmit or modulation and the receive or demodulation components or functions to create a waveform. The individual processing modules comprise a modem that transmits (modulates) and receives (demodulates) a given (single) waveform is shown.

FIG. 3 shows the top row of boxes (functions) show the various stages that are required to accept user data which is in many cases, but not limited to, serial bit stream, Ethernet (frames), and IP (packets) and received in the Input Conditioning function. The user data may be generated by an application operating as a high-level coding language on a high-performance computing (HPC) system, which includes at least one central processing unit and at least one hardware accelerator. The central processing unit may be a general purpose processing unit or a single purpose processing unit. The hardware accelerator may be a floating point coprocessor, a general purpose graphics processing unit, or a FPGA. The user data is then accepted as bits, bytes, frames, or packets of data into the Input Conditioning function, where it is framed into a suitable transport frame with header information (control bytes, sequence number, type information, etc.) and error checking is added. In the next stage, the data is encoded with Forward Error Correction (FEC) information for data recover at the distant end. In the next stage, if the data is not already in a serial format, the data may be taken from a parallel format to a serial format by a firmware function, transforming into a serial data stream. The next section accepts the serial data stream and then performs the mapping of the bits into symbols to create a waveform constellation as modulated data. The modulated data is then filtered (pulse shaped) with a digital filter implemented. All of the functions described to create the resulting filtered (pulse shaped) waveform may be done in a hardware device or as a virtualized (all software) function. In the specialized modulator or modulator section of a modem, the output then flows to a Digital to Analog Converter (DAC) or to a digital output stream to another stage of processing via Ethernet (frames) and IP (packets). Continuing with FIG. 3, the receive (demodulation) chain, performs the reverse functionality as the transmit (modulation) chain. First it is assumed an Analog to Digital Converter (ADC) has accepted an incoming analog waveform and digitized the signal or the signal was received over an analog or digital Intermediate Frequency (IF) digitized stream such as Ethernet (frames) and IP (packets). The input on the bottom row, right side show the first step is to perform gain control to add amplification or attenuation. The next step is to apply baseband filtering to the digitized stream. The next step is to perform the demodulation of the incoming stream into de-mapped data bits. The next step is to pass the stream to a FEC decoder. FEC decoding is a hardware intensive function. The next step is to verify the integrity of the data via error checking. The next step is to de-frame the frames and remove any control and error checking overhead bits and pass to the user the recovered digital stream as a serial bit stream, framed, or packetized data. All of the functions described to receive and provide the resulting user data may be done in a hardware device or as a virtualized (all software) function.

As shown in FIG. 3, the entire configuration of the modem is controlled by a system controller device or application. The system processor may be a dedicated hardware device or software application as part of a virtualized modem that controls the entire modem. The system controller (control processor) manages the entire unit's health, status, configuration, setup, error checking and in many cases performs the user interface. The virtualized modem may be implemented with a commercial off the shelf high-performance computer server and an open computing framework. The open computing framework may be an open source application programming interface.

Figure 4:
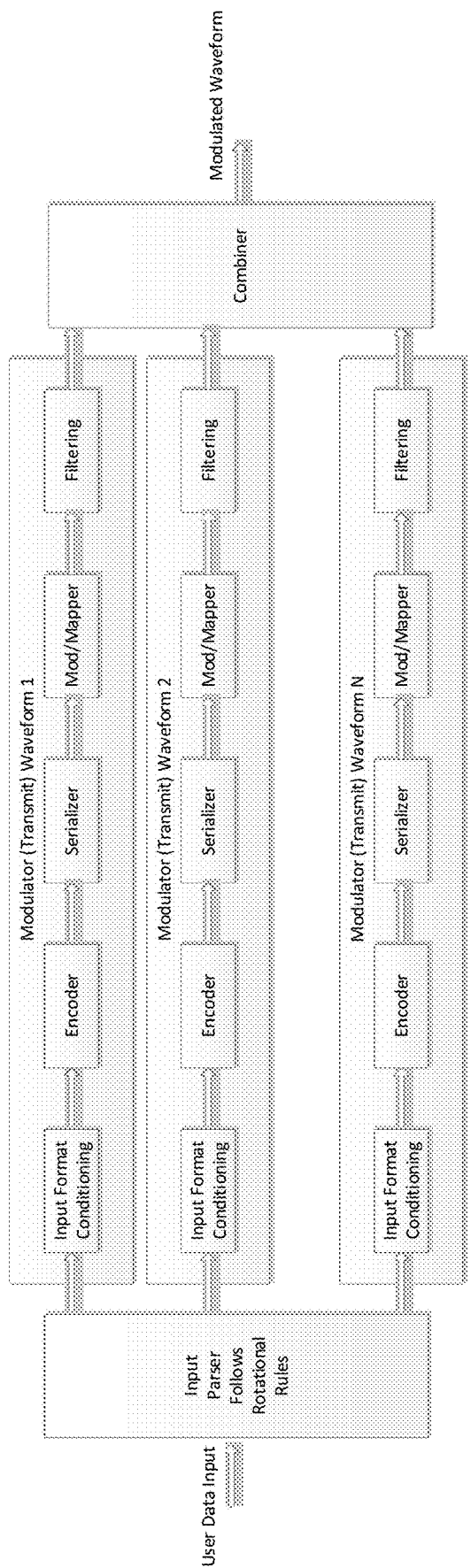
FIG. 4 shows described invention where components to support the modulation capabilities for creating a multi-rotational waveform.

FIG. 4 shows the preferred embodiment of the transmit modem utilizing the described invention. All of the components described in the transmit section of FIG. 3 are present, but there are multiple instantiations of the transmitter utilized to perform the method. In the prior art, only one modulator would be present, but in the preferred embodiment, using highly integrated technology or virtualized modem technology, more than one transmit modem must be present. There is no limit for the number of transmit modulators that are implied using the described method. Each transmit chain (modulator) may be present and ready to accept data from the input parser and the input parser is programmed to carry out the rules as to how an incoming user data stream's data is parsed and each portion of the incoming stream is then passed to a given modulator to perform a particular type of modulation or resulting waveform. Modulated data streams as outputs from each modulator are then combined to modulated waveform streams by a combiner. While discrete logic parts would be highly inefficient, these functions may easily be realized using a virtualized modem approach, where all modulation is carried out by a software application. The rules for carrying out the parsing of the serial data stream, incoming frames or packets, define the level of security placed on the transmitted data stream. The resulting transmitted waveform may be spectrally bound to the same power, frequency, bandwidth, modulation, spectral efficiency, spectral containment, waveform family (type), etc., but this is not an absolute requirement. In fact, each modulator, in turn, may change the characteristics of the transmitted waveform each time it is selected to transmit a portion of the data or it may remain the same each time it is chosen to transmit.

Figure 5:
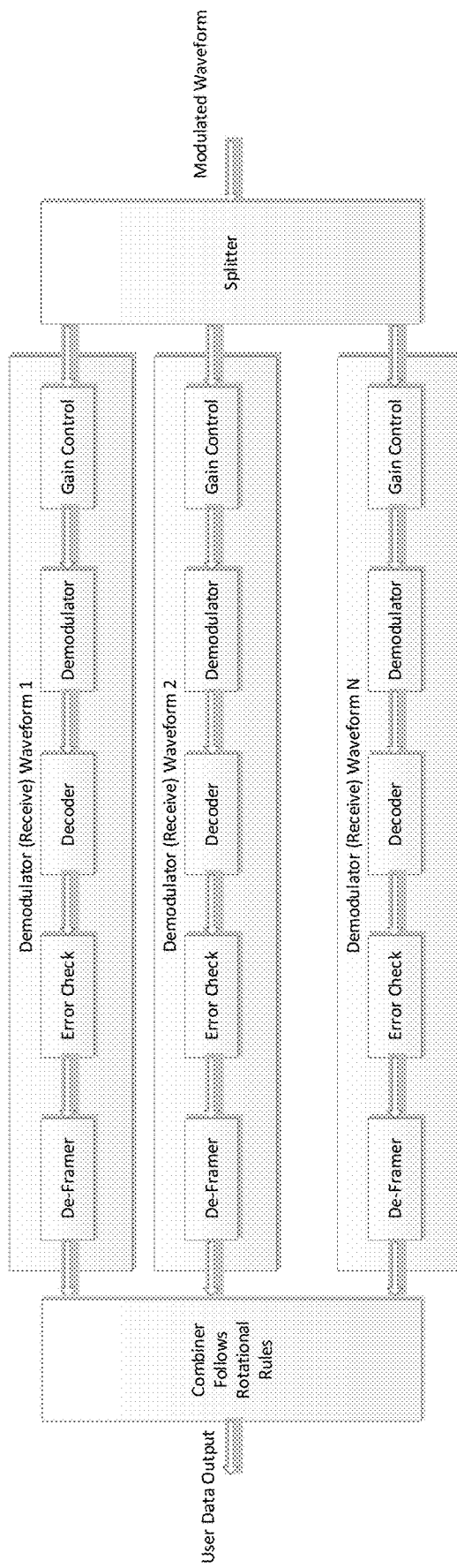
FIG. 5 shows described invention where components to support the demodulation capabilities for creating a multi-rotational waveform.

FIG. 5 shows the preferred embodiment of the receive modem utilizing the described invention. All components described in the receive section of FIG. 3 are present, but there are multiple instantiations of the receiver utilized to perform the method. In the prior art, only one demodulator would be present, but in the preferred embodiment, using highly integrated technology or virtualized modem technology, more than one receive modem must be present. There is no limit for the number of receive demodulators that are implied using the described method. Each receive chain (demodulator) may be present and ready to accept a modulated waveform from the input splitter and the rules of the input parser (from the transmit) may be programmed to carry out the rules as to how an incoming modulated stream's data was parsed and each portion of the incoming modulated stream is then passed to a given demodulator to perform a particular type of demodulation or resulting waveform. In an alternate embodiment, where a priori knowledge is not required, a bank of demodulators may blindly demodulate the incoming waveform streams, this would not be the most optimal approach and would be considered a brute force way to implement the described approach. While discrete logic parts would be highly inefficient, these functions may easily be realized using a virtualized modem approach, where all demodulation is carried out by a software application. The software application (the modem application) may be operating as a high-level coding language on a high performance computer (HPC) system, which includes at least one central processing unit and at least one hardware accelerator. The central processing unit may be a general purpose processing unit or a single purpose processing unit. The hardware accelerator may be a floating point coprocessor, a general purpose graphics processing unit, or a FPGA. The modem application may be computer software, or a program or series of programs, such as one that may be used for mobile devices or for desktop applications, and may be downloaded and installed all at once. The modem application may run inside an operating system until the modem application is closed. The rules for carrying out the original parsing of the serial data stream, incoming frames or packets, at the modulator, resulting in the modulated waveforms, this results in the level of security placed on the transmitted data stream. The resulting transmitted waveform may be spectrally bound to the same power, frequency, bandwidth, modulation, spectral efficiency, spectral containment, waveform family (type), etc., but this is not an absolute requirement. Unless an unwanted listener had the exact knowledge, configuration, requisite number of demodulators, etc. there would be minimal probability of interception of an incoming data stream. In fact, if a priori knowledge of a given waveform is known, each demodulator, in turn, may change the characteristics of the receive waveform each time it is selected to receive a portion of the data or it may remain the same each time it is chosen to receive.

Figure 6:
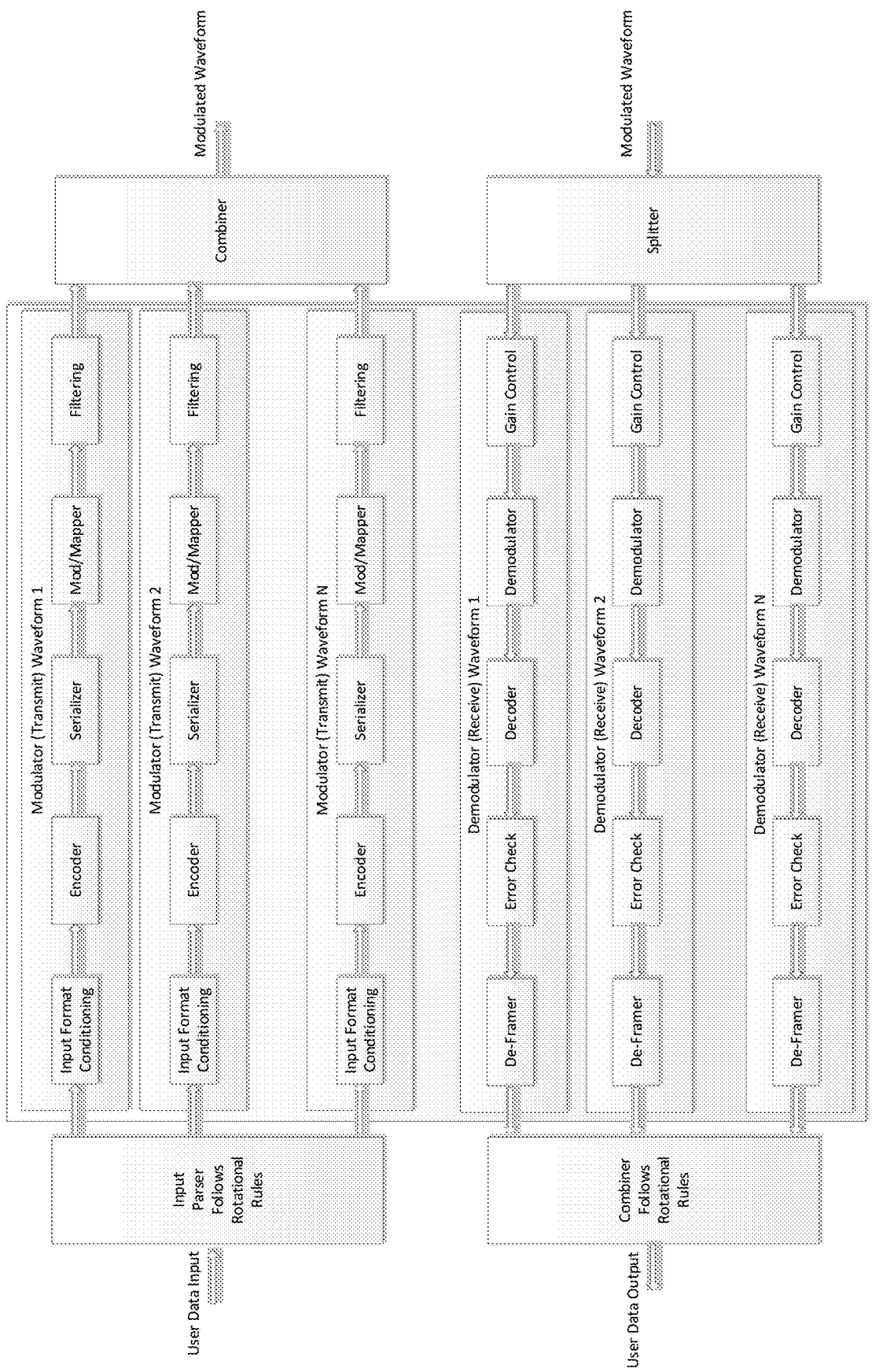
FIG. 6 shows described invention where components to support the modulation and demodulation capabilities for creating a multi-rotational waveform.

FIG. 6 shows a preferred embodiment where the transmit and receive functions are combined into a single platform to provide a modem containing virtualized waveforms, where a single hardware platform known as a High Performance Computing (HPC) device is supporting the plurality of waveforms as software applications.

Figure 7:
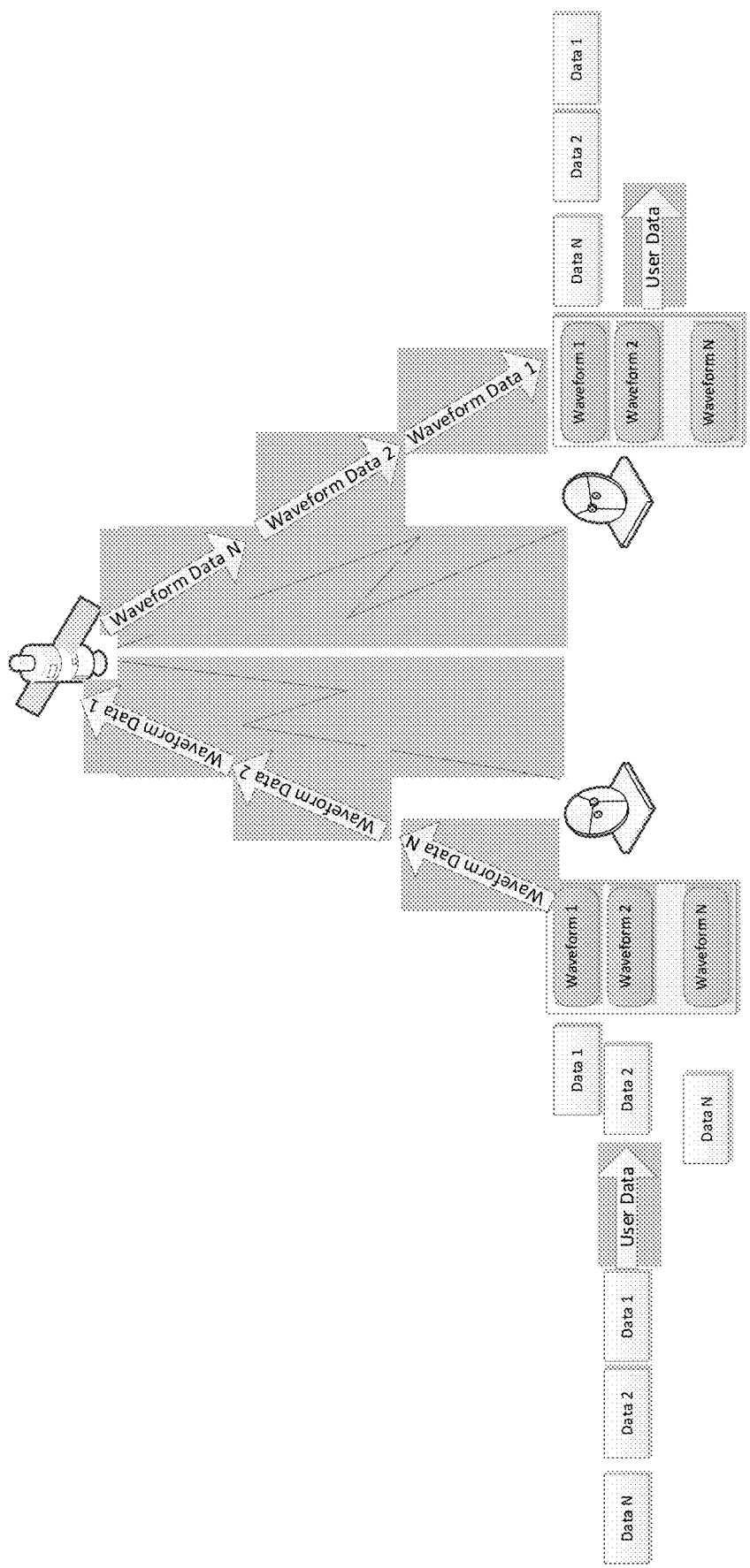
FIG. 7 shows the end-to-end flow of data for a data flow using the described invention where an input user data flow is received by a single transmission medium showing the creation of the multi-rotational waveform being created and transmitted and received and the multi-rotational waveform being return to the received data stream using the multi-rotational waveform.

FIG. 7 shows a preferred embodiment where the transmit and receive functions are combined into a single platform to provide a modem using a single transmit medium implementing the described method. The input parser follows preprogrammed rules for accepting user data and passing the data to a given waveform to be modulated. In FIG. 7, Data 1 would be passed to Waveform 1, and then the data is modulated by modulator for Waveform 1 and then transmitted as Waveform Data 1. Data 2 would be passed to Waveform 2, and then the data is modulated by modulator for Waveform 2 and then transmitted as Waveform Data 2. Data 3 would be passed to Waveform 3, and then the data is modulated by modulator for Waveform 3 and then transmitted as Waveform Data 3. Data N would be passed to Waveform N, and then the data is modulated by modulator for Waveform N and then transmitted as Waveform Data N. Finally, Data N+1 would be passed to Waveform 1, and then the data is modulated by modulator for Waveform 1 and then transmitted as Waveform Data N+1. At the receiving side, for a preferred embodiment, all demodulators would be instantiated and ready to receive data. However, knowing the rules for creating the waveforms, a priori, would allow each demodulator to be standing by or ready to receive the data in turn as each packet is received. As show in FIG. 7, Waveform Data 1 would be passed to Waveform 1, and then the data is demodulated by demodulator for Waveform 1 and then output as Data 1. Waveform Data 2 would be passed to Waveform 2, and then the waveform data is demodulated by demodulator for Waveform 2 and then output as Data 2. Waveform Data 3 would be passed to Waveform 3, and then the waveform data is demodulated by demodulator for Waveform 3 and then output as Data 3. Waveform Data N would be passed to Waveform N, and then the waveform data is demodulated by demodulator for Waveform N and then output as Waveform Data N. Finally, Waveform Data N+1 would be passed to Waveform 1, and then the waveform data is demodulated by demodulator for Waveform 1 and then output as Data N+1. The preferred embodiment is supported and contains virtualized waveforms, where a single hardware platform known as an HPC device is supporting the plurality of waveforms as software applications.

Figure 8:
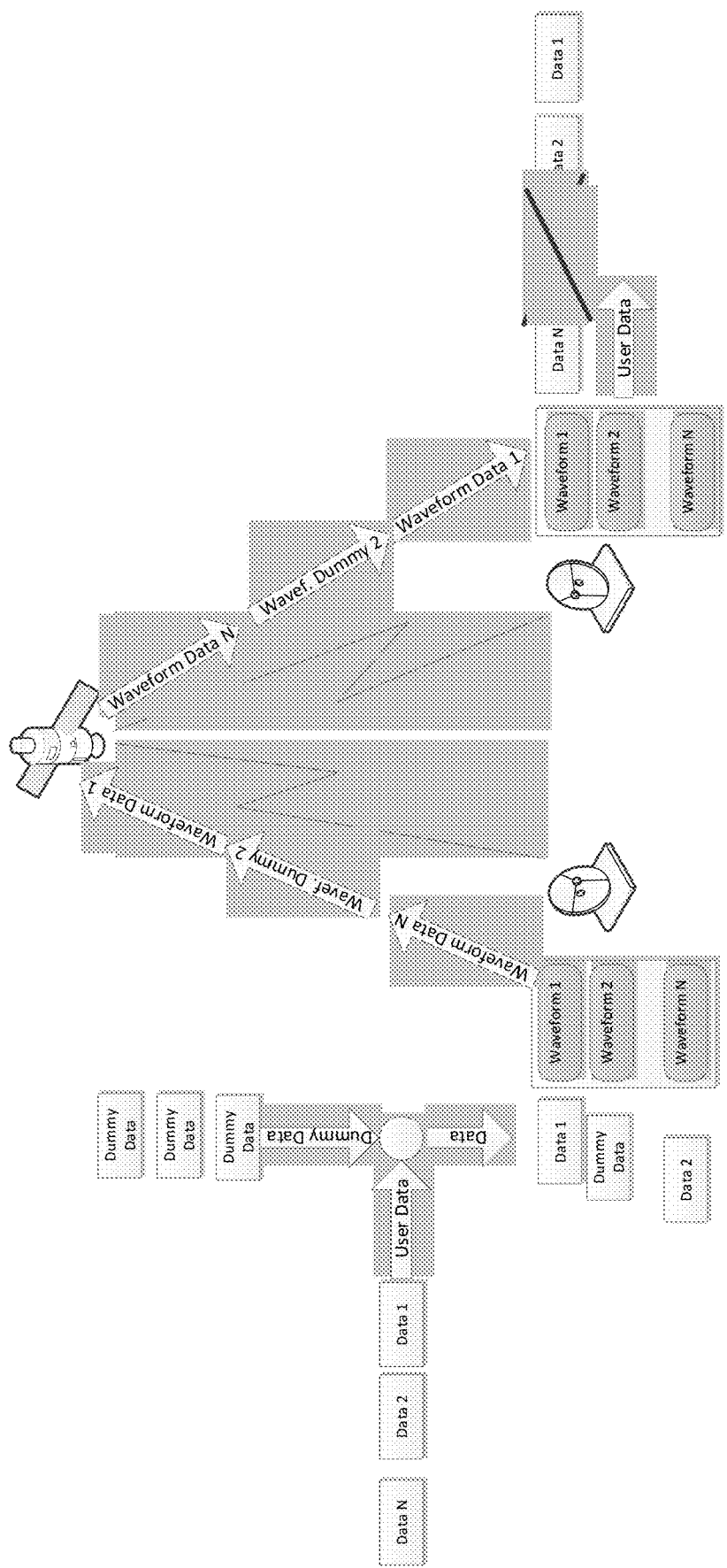
FIG. 8 shows the end-to-end flow of data for a data flow using the described invention where an input user data flow is received and combined with dummy data for obfuscation purposes by a single transmission medium showing the creation of the multi-rotational waveform being created and transmitted and received and the multi-rotational waveform, and the received stream's dummy and actual user data are extracted, and the dummy data is deleted, but the user data is passed to the received data stream using the multi-rotational waveform.

FIG. 8 shows an alternate embodiment where dummy data is inserted into the user data stream to provide additional obfuscation of a resulting waveform based on additional exercising of the method to provide dummy or false data into the data stream. Unless an unwanted listener knows the precise configuration, a priori, of the sequence information, the dummy data would confuse the unwanted user, since data would be out of place or result in a misalignment of an incoming data stream or flow. The transmit and receive functions are combined into a single platform to provide a modem using a single transmit medium implementing the described method. The input parser follows preprogrammed rules for accepting user data and passing the data to a given waveform to be modulated along with the dummy data. In FIG. 8, Data 1 would be passed to Waveform 1, and then the data is modulated by modulator for Waveform 1 and then transmitted as Waveform Data 1. Dummy Data would be passed to Waveform 2, and then the data is modulated by modulator for Waveform Dummy 2 and then transmitted as Waveform Dummy 2. Data 3 would be passed to Waveform 3, and then the data is modulated by modulator for Waveform 3 and then transmitted as Waveform Data 3. Data N would be passed to Waveform N, and then the data is modulated by modulator for Waveform N and then transmitted as Waveform Data N. Finally, Data N+1 would be passed to Waveform 1, and then the data is modulated by modulator for Waveform 1 and then transmitted as Waveform Data N+1. Dummy data may be inserted at any desired cycle based on the rules of the configuration. At the receiving side, for an alternate embodiment, all demodulators would be instantiated and ready to receive data. However, knowing the rules for creating the waveforms, a priori, would allow each demodulator to be standing by or ready to receive the data in turn as each packet is received. As show in FIG. 8, Waveform Data 1 would be passed to Waveform 1, and then the data is demodulated by demodulator for Waveform 1 and then output as Data 1. Waveform Dummy 2 would be passed to Waveform 2, and then the waveform data is demodulated by demodulator for Waveform 2 and then discarded. Waveform Data 3 would be passed to Waveform 3, and then the waveform data is demodulated by demodulator for Waveform 3 and then output as Data 3. Waveform Data N would be passed to Waveform N, and then the waveform data is demodulated by demodulator for Waveform N and then output as Waveform Data N. Finally, Waveform Data N+1 would be passed to Waveform 1, and then the waveform data is demodulated by demodulator for Waveform 1 and then output as Data N+1. In the described method, only actual "real data" would be output to the user and all dummy data used to obfuscate the channel would be passed to the user. The alternate embodiment is supported and contains virtualized waveforms, where a single hardware platform known as an HPC device is supporting the plurality of waveforms as software applications.

Figure 9:
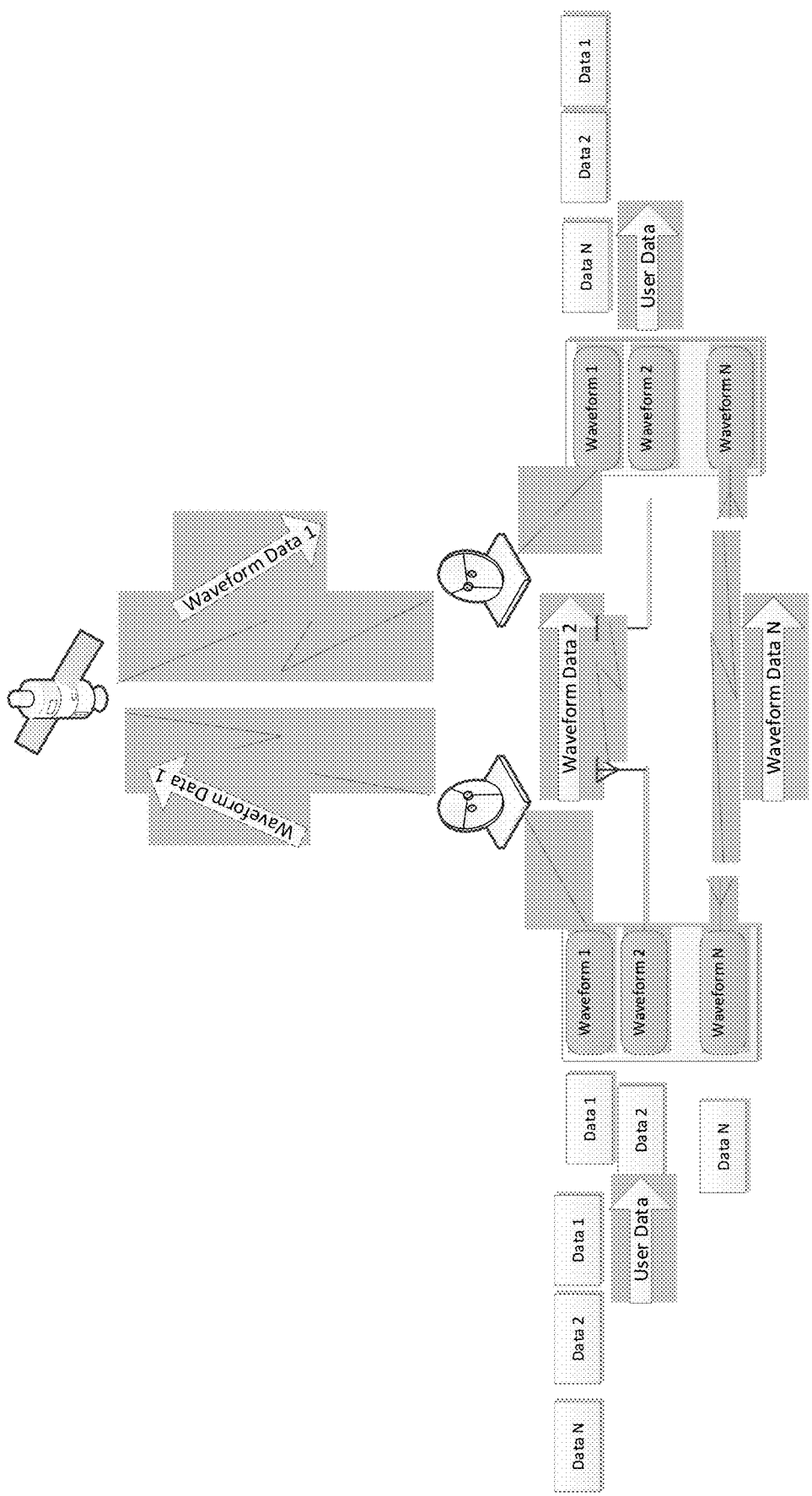
FIG. 9 shows the end-to-end flow of data for a data flow using the described invention where an input user data flow is received and a plurality of transmission mediums showing the creation of the multi-rotational waveform being created and transmitted and received and the multi-rotational waveform over the plurality of transmission paths, and the received streams are combined, and the user data is passed to the received data stream using the multi-rotational waveform.

FIG. 9 shows an alternate embodiment where each modulators output may be passed over a different transmission path. Each modulator may be assigned to a transmission path such as, but not limited, to satellite, airborne, optical, tactical radio, terrestrial radio, etc. Each modulation scheme chosen may be assigned a dedicated modulation type or the modulation type may be altered based on the rules assigned by the input parser. FIG. 9 demonstrates the transmit modulator using a plurality of transmit mediums implementing the described method. The input parser follows preprogrammed rules for accepting user data and passing the data to a given waveform to be modulated. In FIG. 9, Data 1 would be passed to Waveform 1, and then the data is modulated by modulator for Waveform 1 and then transmitted as Waveform Data 1 over a satellite transmission path. Data 2 would be passed to Waveform 2, and then the data is modulated by modulator for Waveform 2 and then transmitted as Waveform Data 2 over a tactical radio transmission path. Data 3 would be passed to Waveform 3, and then the data is modulated by modulator for Waveform 3 and then transmitted as Waveform Data 3 over a third transmission path. Data N would be passed to Waveform N, and then the data is modulated by modulator for Waveform N and then transmitted as Waveform Data N over an optical transmission path. Finally, Data N+1 would be passed to Waveform 1, and then the data is modulated by modulator for Waveform 1 and then transmitted as Waveform Data N+1 over any one of the transmission paths. At the receiving side, for an alternate embodiment, all demodulators would be instantiated and ready to receive data. However, knowing the rules for creating the waveforms, a priori, would allow each demodulator to be standing by or ready to receive the data in turn as each packet is received. As show in FIG. 9, Waveform Data 1 would be passed to Waveform 1, and then the data is demodulated by demodulator for Waveform 1 and then output as Data 1. Waveform Data 2 would be passed to Waveform 2, and then the waveform data is demodulated by demodulator for Waveform 2 and then output as Data 2. Waveform Data 3 would be passed to Waveform 3, and then the waveform data is demodulated by demodulator for Waveform 3 and then output as Data 3. Waveform Data N would be passed to Waveform N, and then the waveform data is demodulated by demodulator for Waveform N and then output as Waveform Data N. Finally, Waveform Data N+1 would be passed to Waveform 1, and then the waveform data is demodulated by demodulator for Waveform 1 and then output as Data N+1. The use of dummy packets may also be brought to bear using multiple transmission paths. The alternate embodiment is supported and contains virtualized waveforms, where a single hardware platform known as an HPC device is supporting the plurality of waveforms as software applications.

Figure 10:
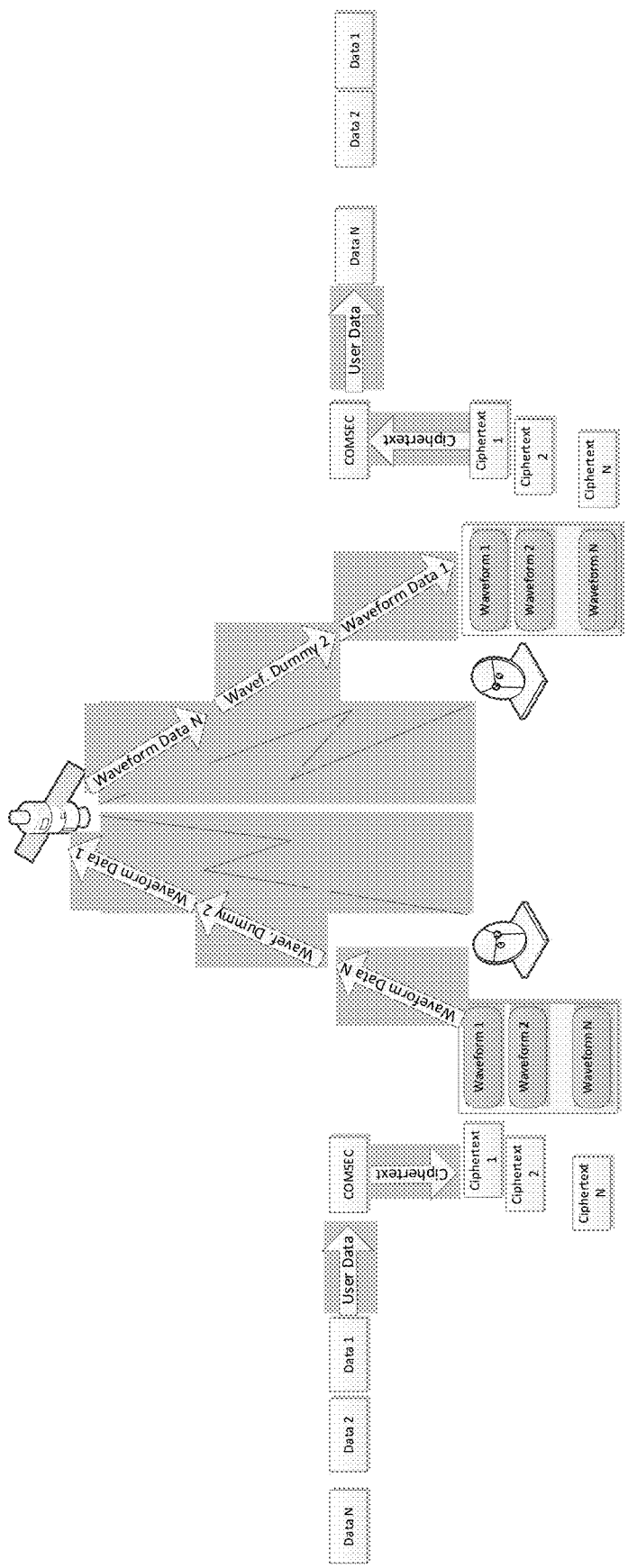
FIG. 10 shows the end-to-end flow of data for a data flow using the described invention where an input user data flow is received and a communication security (COMSEC) algorithm unique and specific for each waveform is applied to the user data for encryption and obfuscation.

FIG. 10 shows an alternate embodiment where COMSEC algorithm unique for each waveform type is applied to the respective User Data. Unless an unwanted listener knows the precise COMSEC algorithm and shared secret required for detection and decryption of a given waveform, the user data is encrypted and obfuscated. The transmit and receive functions are combined into a single platform to provide a modem using a single transmit medium implementing the described method. The input parser follows preprogrammed rules for accepting user data, applying the appropriate COMSEC for a given waveform, and passing the ciphertext to a given waveform to be modulated. In FIG. 10, Data 1 would be encrypted using a cryptographic algorithm and passed to Waveform 1, and then the ciphertext is modulated by modulator for Waveform 1 and then transmitted as Waveform Data 1. Data 2 would be encrypted using another cryptographic algorithm and passed to Waveform 2, and then the ciphertext is modulated by modulator for Waveform 2 and then transmitted as Waveform Data 2. Data N would be encrypted using another cryptographic algorithm and passed to Waveform N, and then the ciphertext is modulated by modulator for Waveform N and then transmitted as Waveform Data N. At the receiving side, for an alternate embodiment, all demodulators would be instantiated and ready to receive data. However, knowing the rules for creating the waveforms, a priori, would allow each demodulator to be standing by or ready to receive the data in turn as each packet is received. As shown in FIG. 10, Waveform Data 1 would be passed to Waveform 1, and then the data is demodulated by the demodulator for Waveform 1, and then the appropriate cryptographic algorithm and shared secret is applied to decrypt the ciphertext, and then output as Data 1. Waveform Data 2 would be passed to Waveform 2, and then the waveform data is demodulated by the demodulator for Waveform 2, and then the appropriate cryptographic algorithm and shared secret is applied to decrypt the ciphertext, and then output as Data 2. Waveform Data N would be passed to Waveform N, and then the waveform data is demodulated by the demodulator for Waveform N, and then the appropriate cryptographic algorithm and shared secret is applied to decrypt the ciphertext, and then output as Waveform Data N.

Using the described method, the parsing of the data may be done in any manner of ways:

Bit-by-bit
Byte-by-byte
Frame-by-frame
Packet-by-packet
FEC block-by-FEC block
Crypto logical boundary by Crypto logical boundary In no way is the parsing of the data and the delivery to a given waveform mandated by a fixed boundary but may be defined to suite a user's needs. Additionally, the data passed into the waveform modulators may be scrambled, encrypted, re-ordered, and dummy data (bits, bytes, frames, and packets) added to further obfuscate the data stream.

In an alternate embodiment, a Transmission Security (TRANSEC) may be applied to the user data stream with or without applying COMSEC algorithm.

Furthermore, the assignment of waveform modulator or transmission path utilized by said modulator may be assigned sequentially, mathematically, pseudo randomly, linearly, non-linearly, etc. and the receive may be instructed a priori as to the given incoming sequence or the method may be run blindly, so the receiving end must have the "correct" demodulators present to attempt to lock on or decode any and all streams.

The operation of assignment of the waveform selection for the transmission and resulting reception requires one that is unified between transmit and receive based on the selection of a particular modulator and resulting demodulator at the transmit and receiving end, respectively. Additionally, the algorithm selected for performing the parsing of the incoming data follows a unified set of rules between the respective ends (transmit and receive) that allows the choice of a given path to be the novelty of the invention thus providing the protection of the data as a result of the diverse waveforms and/or transmission paths. The assignment of the waveform for transmission may also be relayed to the receiving demodulator via a signaling channel, in a manner to provide a dynamic assignment of the sequence of waveforms. The assignment of the transmission sequence (assignment of transmission waveform or channel) may be sent via a secondary channel (wireless, wired, a priori instruction, etc.) through the use of a dedicated low-probability of interference (LPI) and low-probability of detection (LPI/LPD) signal as a way to notify the end receiving demodulator.

The same method for rotational waveforms as described in the patent disclosure can be applied to a whole different application; specifically, for the purposes of "Network Optimization" to deliver quality of service to the end user. In cases where there is network congestion or complete loss of a particular communication path, the same method of rotational waveforms can be used redistribute transmission of user data across one or more communication paths, each requiring its own specific communication waveform. The one and only difference between the method as described for the data security use case from the "Network Optimization" use case are the rules for waveform rotation. In the data security use case, the rules for waveform rotation are governed by mathematical equations and random numbers with the intent of creating obfuscation for a potential network intruder. On the other hand, the rules of waveform rotation for the Network Optimization use case is governed by algorithms that aim to optimize a network performance parameter, such Continuous Information Rate (CIR), minimum latency, throughput, reliability, data priority, or any other user quality of service parameter.

Switching from one transmission path may involve the synchronization between a multitude of repeating relays such as a simply repeating relay for balloon, airborne, or satellite, as well as a sophisticated relay such as a high-throughput satellite (HTS), cellular network, etc., where the waveforms are completely synchronized between the end points as well as interfacing to the processed and non-processed relays and repeating stations. This may be viewed as make-before-break connection as well as a break-before-make operation when switching the waveforms.

The described system supports any modulation method including the use of both frequency hopping spread spectrum (FHSS) and direct sequence spread spectrum (DSSS) and hybrid spread spectrum which is the combined FHSS and DSSS, as well as fixed/continuous carrier and burst (periodic) transmission carriers.

The following are particular implementations with the multi-rotational waveform scheme and the use of these methods are provided as non-limiting examples.

1. A user requires data to be passed to an end satellite station. Using the described invention, a flow is created to encapsulate the user data for transport over the network as Ethernet frames and/or IP packets to the data center. The modulator uses three waveforms to accomplish the desired method. The first modulation scheme is Digital Video Broadcast-Satellite Version 2 (DVB-S2) using QPSK rate 1/2 FEC, the second modulation scheme is the NATO Standard Agreement (STANG) 4486 using QPSK rate 1/2 FEC, and the third is proprietary Multi Access Waveform (MAW) based on Time Division Multiple Access (TDMA) utilizing Viterbi and Reed-Solomon (RS) rate 1/2 encoding and QPSK modulation. The configuration transmits each packet in a manner where every packet sequentially rotates (advances) to the next waveform in a round-robin fashion. The parsing and recombining of the user data is handled on a frame-by-frame boundary. A repeating relay satellite enables communications over a single transmission carrier between the satellite teleport and end satellite receiving station. The end user must have all three waveforms available to fully decode each of the transmitted frames being passed over the satellite link. The described method provides a secure method to pass the packets to the end user and the data is transferred. Should any one of the waveforms not be available nor supported, a portion of the data will be missing in the data stream.

2. A user requires data to be passed to an end satellite station. Using the described invention, a flow is created to encapsulate the user data for transport over the network as Ethernet frames and/or IP packets to the data center. The modulator uses four waveforms to accomplish the desired method. The first modulation scheme is Digital Video Broadcast-Satellite Version 2 (DVB-S2x) using 16-APSK rate 3/4 FEC, the second modulation scheme is the NATO Standard Agreement (STANG) 4486 using QPSK rate 1/2 FEC, the third is proprietary Viterbi, and Reed-Solomon (RS) waveform using 8PSK rate 9/10 FEC, and the fourth is a proprietary MAW based Frequency Division Multiple Access (FDMA) utilizing 8PSK rate 2/3 FEC with a unique Gold Code. The configuration transmits each packet in a manner where every packet randomly rotates (advances) to the next waveform according to a Pseudo Random Number Generator (PRBS) or a True Random Number Generator (TRNG) that is seeded with a common initialization vector (IV). The parsing and recombining of the user data is handled on a byte boundary. However, after the end of every fourth packet a dummy packet is inserted to obfuscate the user data. A repeating relay satellite enables communications over a single transmission carrier between the satellite teleport and end satellite receiving station. The end user must have all four waveforms available to fully decode each of the transmitted frames but must be aware of the use of dummy packets and discard the dummy packet after being passed over the satellite link. The described method provides a secure method to pass the packets is established to the end user and the data is transferred but discard unwanted dummy packets. Should any one of the waveforms not be available nor supported, a portion of the data will be missing in the data stream.
3. In particular implementations of the system described in example 2, dummy data may be inserted into the user data to obfuscate the actual user data. Should the receiving end not remove the data, then data corruption would result.
4. A user requires data to be passed to an end station. Using the described invention, three communication paths are established: Satellite, line-of-sight terrestrial radio link, and an airborne relay. Three flows are created to encapsulate the user data for transport over all three paths may be used. The modulator uses three waveforms with three different paths to accomplish the desired method. The first modulation scheme is Digital Video Broadcast-Satellite Version 2 (DVB-S2) over the satellite link, the second modulation scheme is uses a DVB-T2 terrestrial radio link, and the third is proprietary Viterbi, and Reed-Solomon (RS) waveform over the airborne relay. Furthermore, each transmission path implements its own unique COMSEC method. The configuration transmits each packet in a manner where every packet sequentially rotates (advances) through all even indices in the list of waveforms. The parsing and recombining of the user data is handled on a COMSEC Crypto boundary. The end user must have all three transmission paths, all waveforms, and knowledge of each COMSEC algorithm and shared secret available to fully decode and decrypt each of the transmitted frames being passed over the links. The described method provides a secure method to pass the packets is established to the end user and the data is transferred. Should any one of the transmission paths, waveforms, or cryptographic method and shared secret not be available nor supported, a portion of the data will be missing in the data stream.
5. In particular implementations of the system described in example 4, dummy data may be inserted on any one of the links to obfuscate the actual user data.

The present disclosure provides, for example, the following:

1. A modem system for transmitting and receiving multi-rotational waveforms comprising:
    a plurality of waveform modulation subsystems comprising;
        an application operating as a high-level coding language on a high-performance computing (HPC) system comprised of at least one central processing unit and at least one hardware accelerator; an input parsing interface to receive a user data as a bit, a byte, a frame, or packet, and to transform the user data into a first digital user data stream;
        a plurality of modulators interfacing with the input format conditioning parsing interface and communicatively coupled to an encoder for forward error correction;
        a mapping function configured to convert the first user data stream to a first modulated user data stream;
        a filter function configured to filter electronically the first modulated user data stream; and
        a digital-to-analog converter configured to convert a plurality of modulated waveform streams to a first analog modulated communication waveform, wherein the plurality of modulated waveform streams is the user data converted via the plurality of modulators, wherein the plurality of modulated waveform streams is combined and passed to a dedicated transmitter as a single output stream; and
    a demodulation subsystem performed via an application operating as a high-level coding language on a high-performance computing (HPC) system comprised of at least one central processing unit and at least one hardware accelerator configured to receive a plurality of inputs from unique modulated transmission paths containing a second analog modulated communication waveform, wherein the demodulation subsystem comprises:
        an analog-to-digital signal converter configured to convert the second analog modulated communication waveform to a multi-rotational waveform and wherein the multi-rotational waveform is split to a plurality of demodulator pathways, wherein each of the demodulator pathways comprises:
            a gain/attenuation function;
            a baseband filtering function;
            a demodulation function programmed to convert a second modulated user data stream to demapped data bits;
            a forward error correction (FEC) function;
            an error checking function; and
            a deframing function configured to remove the framing format of the second modulated user data stream;
        wherein the gain/attenuation function, the baseband filtering function, the demodulation function, the forward error correction function, the error checking function, and the deframing function are combined from each demodulator to form a single output user data stream.
2. The modem system of 1, wherein at least one of the plurality of modulators further comprises a format conversion function configured to convert the user data from a parallel format to a serial format.
3. The modem system of 1, wherein a dummy frame is inserted into the first digital user data stream.
4. The modem system of 3, wherein the dummy frame is removed from the second digital user data stream.
5. The modem system of 1, further comprising at least one of a Communication Security (COMSEC) unique for each waveform type or a Transmission Security (TRANSEC), wherein the COMSEC is applied to the user data to provide encryption and TRANSEC is applied to the first digital user data stream to provide obfuscation.
6. The modem system of 5, wherein the COMSEC, the TRANSEC, or the COMSEC and the TRANSEC is detected and decrypted from the second modulated user data stream.
7. The modem system of 1, wherein the modem system is implemented via dedicated components to form a purpose-built modem system.
8. The modem system of 1, wherein the modem system is implemented via a virtualized modem with a commercial off the shelf high-performance computing server and an open computing framework to form an all software modem system.
9. The modem system of 1, wherein the modem system selects the first plurality of modulated waveform streams to include sequential, pseudo random, linear, or non-linear algorithm via a mathematical formula.

10. The modem system of 1, wherein the modem system selects the first plurality of modulated waveform streams via a True Random Number Generator.

11. The modem system of 1, wherein a waveform path is selected based on an algorithm to optimize particular network parameters, wherein the network parameters comprises latency, throughput, and reliability.

12. The modem system of 11, wherein the waveform path is selected based on a network optimization algorithm where a network congestion or a loss of a communication path of the user data will cause redistribution of the transmission path of the user data across one or more communication paths.

13. The modem system of 12, wherein the network congestion path will re-establish the waveform path in a make-before-break fashion to maintain Quality of Service.

14. A modem application for transmitting and receiving multi-rotational waveforms comprising:
 a plurality of waveform modulation subsystems comprising;
  an application operating as a high-level coding language on a high-performance computing (HPC) system comprised of at least one central processing unit and at least one hardware accelerator; an input parsing interface to receive a user data as a bit, a byte, a frame, or packet, and to transform the user data into a first digital user data stream;
  a plurality of modulators interfacing with the input format conditioning parsing interface and communicatively coupled to an encoder for forward error correction;
  a mapping function configured to convert the first user data stream to a first modulated user data stream;
  a filter function configured to filter electronically the first modulated user data stream; and
  a digital-to-analog converter configured to convert a plurality of modulated waveform streams to a first analog modulated communication waveform, wherein the plurality of modulated waveform streams is the user data converted via the plurality of modulators, wherein the plurality of modulated waveform streams is combined and passed to a dedicated transmitter as a single output stream; and
 a demodulation subsystem performed via an application operating as a high-level coding language on a high-performance computing (HPC) system comprised of at least one central processing unit and at least one hardware accelerator configured to receive a plurality of inputs from unique modulated transmission paths containing a second analog modulated communication waveform, wherein the demodulation subsystem comprises:
  an analog-to-digital signal converter configured to convert the second analog modulated communication waveform to a multi-rotational waveform and wherein the multi-rotational waveform is split to a plurality of demodulator pathways, wherein each of the demodulator pathways comprises:
   a gain/attenuation function;
   a baseband filtering function;
   a demodulation function programmed to convert a second modulated user data stream to demapped data bits;
   a forward error correction (FEC) function;
   an error checking function; and
   a deframing function configured to remove the framing format of the second modulated user data stream;
  wherein the gain/attenuation function, the baseband filtering function, the demodulation function, the forward error correction function, the error checking function, and the deframing function are combined from each demodulator to form a single output user data stream.

15. The modem application of 14, wherein at least one of the plurality of modulators further comprises a format conversion function configured to convert the user data from a parallel format to a serial format.

16. The modem application of 14, wherein a dummy frame is inserted into the first digital user data stream.

17. The modem application of 16, wherein the dummy frame is removed from the second digital user data stream.

18. The modem application of 14, further comprising at least one of a Communication Security (COMSEC) unique for each waveform type or a Transmission Security (TRANSEC), wherein the COMSEC is applied to the user data to provide encryption and TRANSEC is applied to the first digital user data stream to provide obfuscation.

19. The modem application of 18, wherein the COMSEC, the TRANSEC, or the COMSEC and the TRANSEC is detected and decrypted from the second modulated user data stream.

20. The modem application of 14, wherein the modem system is implemented via dedicated components to form a purpose-built modem system.

21. The modem application of 14, wherein the modem system is implemented via a virtualized modem with a commercial off the shelf high-performance computing server and an open computing framework to form an all software modem system.

22. The modem application of 14, wherein the modem system selects the first plurality of modulated waveform streams to include sequential, pseudo random, linear, or non-linear algorithm via a mathematical formula.

23. The modem application of 14, wherein the modem system selects the first plurality of modulated waveform streams via a True Random Number Generator.

24. The modem application of 14, wherein a waveform path is selected based on an algorithm to optimize particular network parameters, wherein the network parameters comprises latency, throughput, and reliability.

25. The modem application of 24, wherein the waveform path is selected based on a network optimization algorithm where a network congestion or a loss of a communication path of the user data will cause redistribution of the transmission path of the user data across one or more communication paths.

26. The modem application of 25, wherein the network congestion path will re-establish the waveform path in a make-before-break fashion to maintain Quality of Service.

What is claimed is:
1. A modem system for transmitting and receiving multi-rotational waveforms comprising:
 a plurality of waveform modulation subsystems comprising;

an application operating as a high-level coding language on a high-performance computing (HPC) system comprised of at least one central processing unit and at least one hardware accelerator;

an input parsing interface to receive a user data as a bit, a byte, a frame, or packet, and to transform the user data into a first digital user data stream;

a plurality of modulators interfacing with an input format conditioning parsing interface and communicatively coupled to an encoder for forward error correction;

a mapping function configured to convert the first digital user data stream to a first modulated user data stream;

a filter function configured to filter electronically the first modulated user data stream; and a digital-to-analog converter configured to convert a plurality of modulated waveform streams to a first analog modulated communication waveform, wherein the plurality of modulated waveform streams is the user data converted via the plurality of modulators, wherein the plurality of modulated waveform streams is combined and passed to a dedicated transmitter as a single output stream; and a demodulation subsystem performed via an application operating as a high-level coding language on a high-performance computing (HPC) system comprised of at least one central processing unit and at least one hardware accelerator configured to receive a plurality of inputs from unique modulated transmission paths containing a second analog modulated communication waveform, wherein the demodulation subsystem comprises:

an analog-to-digital signal converter configured to convert the second analog modulated communication waveform to a multi-rotational waveform and wherein the multi-rotational waveform is split to a plurality of demodulator pathways, wherein each of the plurality of demodulator pathways comprises:

a gain/attenuation function;

a baseband filtering function;

a demodulation function programmed to convert the second modulated user data stream to demapped data bits;

a forward error correction (FEC) function;

an error checking function; and a deframing function;

wherein the gain/attenuation function, the baseband filtering function, the demodulation function, the forward error correction function, the error checking function, and the deframing function are combined from each demodulator to form a single output user data stream.

2. The modem system of claim 1, wherein at least one of the plurality of modulators further comprises a format conversion function configured to convert the user data from a parallel format to a serial format.

3. The modem system of claim 1, wherein a dummy frame is inserted into the first digital user data stream.

4. The modem system of claim 1, further comprising at least one of a Communication Security (COMSEC) unique for each waveform type or a Transmission Security (TRANSEC), wherein the COMSEC is applied to the user data to provide encryption and TRANSEC is applied to the first digital user data stream to provide obfuscation.

5. The modem system of claim 4, wherein the COMSEC, the TRANSEC, or the COMSEC and the TRANSEC is detected and decrypted from the second modulated user data stream.

6. The modem system of claim 1, wherein the modem system is implemented via dedicated components to form a purpose-built modem system.

7. The modem system of claim 1, wherein the modem system is implemented via a virtualized modem with a commercial off the shelf high-performance computing server and an open computing framework to form an all software modem system.

8. The modem system of claim 1, wherein the modem system selects the first plurality of modulated waveform streams to include sequential, pseudo random, linear, or non-linear algorithm via a mathematical formula.

9. The modem system of claim 1, wherein the modem system selects the first plurality of modulated waveform streams via a True Random Number Generator.

10. The modem system of claim 1, wherein a waveform path is selected based on an algorithm to optimize particular network parameters, wherein the particular network parameters comprises latency, throughput, and reliability.

11. The modem system of claim 10, wherein the waveform path is selected based on a network optimization algorithm where a network congestion or a loss of a communication path of the user data will cause redistribution of the transmission path of the user data across one or more communication paths.

12. The modem system of claim 11, wherein the network congestion path will re-establish the waveform path in a make-before-break fashion to maintain Quality of Service.

13. A modem application for transmitting and receiving multi-rotational waveforms comprising:

a plurality of waveform modulation subsystems comprising;

an application operating as a high-level coding language on a high-performance computing (HPC) system comprised of at least one central processing unit and at least one hardware accelerator; an input parsing interface to receive a user data as a bit, a byte, a frame, or packet, and to transform the user data into a first digital user data stream;

a plurality of modulators interfacing with an input format conditioning parsing interface and communicatively coupled to an encoder for forward error correction;

a mapping function configured to convert the first digital user data stream to a first modulated user data stream;

a filter function configured to filter electronically the first modulated user data stream; and a digital-to-analog converter configured to convert a plurality of modulated waveform streams to a first analog modulated communication waveform, wherein the plurality of modulated waveform streams is the user data converted via the plurality of modulators, wherein the plurality of modulated waveform streams is combined and passed to a dedicated transmitter as a single output stream; and a demodulation subsystem performed via an application operating as a high-level coding language on a high-performance computing (HPC) system comprised of at least one central processing unit and at least one hardware accelerator configured to receive a plurality of inputs from unique modulated transmission paths containing a second analog modulated communication waveform, wherein the demodulation subsystem comprises:

an analog-to-digital signal converter configured to convert the second analog modulated communication waveform to a multi-rotational waveform and wherein the multi-rotational waveform is split to a plurality of demodulator pathways, wherein each of the plurality demodulator pathways comprises:
a gain/attenuation function;
a baseband filtering function;
a demodulation function programmed to convert the second modulated user data stream to demapped data bits;
a forward error correction (FEC) function;
an error checking function; and
a deframing function;
wherein the gain/attenuation function, the baseband filtering function, the demodulation function, the forward error correction function, the error checking function, and the deframing function are combined from each demodulator to form a single output user data stream.

14. The modem application of claim 13, wherein at least one of the plurality of modulators further comprises a format conversion function configured to convert the user data from a parallel format to a serial format.

15. The modem application of claim 13, wherein a dummy frame is inserted into the first digital user data stream.

16. The modem application of claim 13, further comprising at least one of a Communication Security (COMSEC) unique for each waveform type or a Transmission Security (TRANSEC), wherein the COMSEC is applied to the user data to provide encryption and TRANSEC is applied to the first digital user data stream to provide obfuscation.

17. The modem application of claim 16, wherein the COMSEC, the TRANSEC, or the COMSEC and the TRANSEC is detected and decrypted from the second modulated user data stream.

18. The modem application of claim 13, wherein the modem system is implemented via dedicated components to form a purpose-built modem system.

19. The modem application of claim 13, wherein the modem system is implemented via a virtualized modem with a commercial off the shelf high-performance computing server and an open computing framework to form an all software modem system.

20. The modem application of claim 13, wherein the modem system selects the first plurality of modulated waveform streams to include sequential, pseudo random, linear, or non-linear algorithm via a mathematical formula.

21. The modem application of claim 13, wherein the modem system selects the first plurality of modulated waveform streams via a True Random Number Generator.

22. The modem application of claim 13, wherein a waveform path is selected based on an algorithm to optimize particular network parameters, wherein the particular network parameters comprises latency, throughput, and reliability.

23. The modem application of claim 22, wherein the waveform path is selected based on a network optimization algorithm where a network congestion or a loss of a communication path of the user data will cause redistribution of the transmission path of the user data across one or more communication paths.

24. The modem application of claim 23, wherein the network congestion path will re-establish the waveform path in a make-before-break fashion to maintain Quality of Service.

* * * * *